United Sta

Matsumoto et al.

[11] 3,906,389

[45] Sept. 16, 1975

[54] DIFFERENCE AMPLIFIER WITH GAIN CONTROLLED BY THE SUM OF THE INPUTS

[75] Inventors: Seiichi Matsumoto, Tokyo; Kazuya Hosoe, Machida, both of Japan

[73] Assignee: Canon Kabushiki Kaisha, Tokyo, Japan

[22] Filed: Mar. 26, 1973

[21] Appl. No.: 344,725

[30] Foreign Application Priority Data
Mar. 29, 1972 Japan.............................. 47-31342

[52] U.S. Cl. .................... 330/59; 250/201; 330/29; 330/30 D; 330/69; 330/136; 354/25
[51] Int. Cl.² .................... G03B 13/18; H03F 17/00
[58] Field of Search ....... 330/29, 30 D, 59, 69, 136; 325/404; 95/45; 250/201; 354/25

[56] References Cited
UNITED STATES PATENTS
3,497,717   2/1970   Barber .................................. 330/59
3,610,934   10/1971  Turner .................................. 95/45

Primary Examiner—Ronald L. Wibert
Assistant Examiner—Richard A. Rosenberger
Attorney, Agent, or Firm—Toren, McGeady and Stanger

[57] ABSTRACT

A comparator circuit comprising an amplifier having its input fed as a difference of a pair of inputs and whose gain is controlled by a control signal corresponding to the sum of the pair of inputs so as to provide an amplifier output which is stabilized over a large range of input variation.

6 Claims, 3 Drawing Figures

PATENTED SEP 16 1975 3,906,389

DIFFERENCE AMPLIFIER WITH GAIN CONTROLLED BY THE SUM OF THE INPUTS

BACKGROUND OF INVENTION

The invention relates to a comparator circuit, and more particularly to a comparator circuit suitable for use with the control circuit of an automatic focus adjusting apparatus which automatically detects the focal position of an optical system.

An automatic focus adjusting apparatus is heretofore known in which automatic focussing is achieved in accordance with the distance to an object being photographed by receiving reflected radiation from the object by a light receiving system which feeds, through polarizing means, a pair of photoconductive elements to detect the flux incident thereon so as to derive a difference in the incident intensity upon the both elements for controlling a servo mechanism in accordance with such difference. With such an apparatus, the difference in the incident intensity of the both elements may vary over an extensive range, with consequence that the response of the servo mechanism, e.g. the number of revolutions of a servo motor, also undergoes a large variation. This causes a hunting phenomenon of the servo mechanism in adjusting the focal length and also causes a degradation in the accuracy of determining the distance by the automatic focus adjusting apparatus.

Therefore, it is a primary object of the invention to overcome above disadvantages and to provide a comparator circuit suitable for use with an automatic focus adjusting apparatus for providing an improved accuracy of determining the distance to an object being photographed.

Other objects of the invention will become apparent from the following detailed description of a specific embodiment of the invention.

DETAILED DESCRIPTION OF INVENTION

Figure 1:
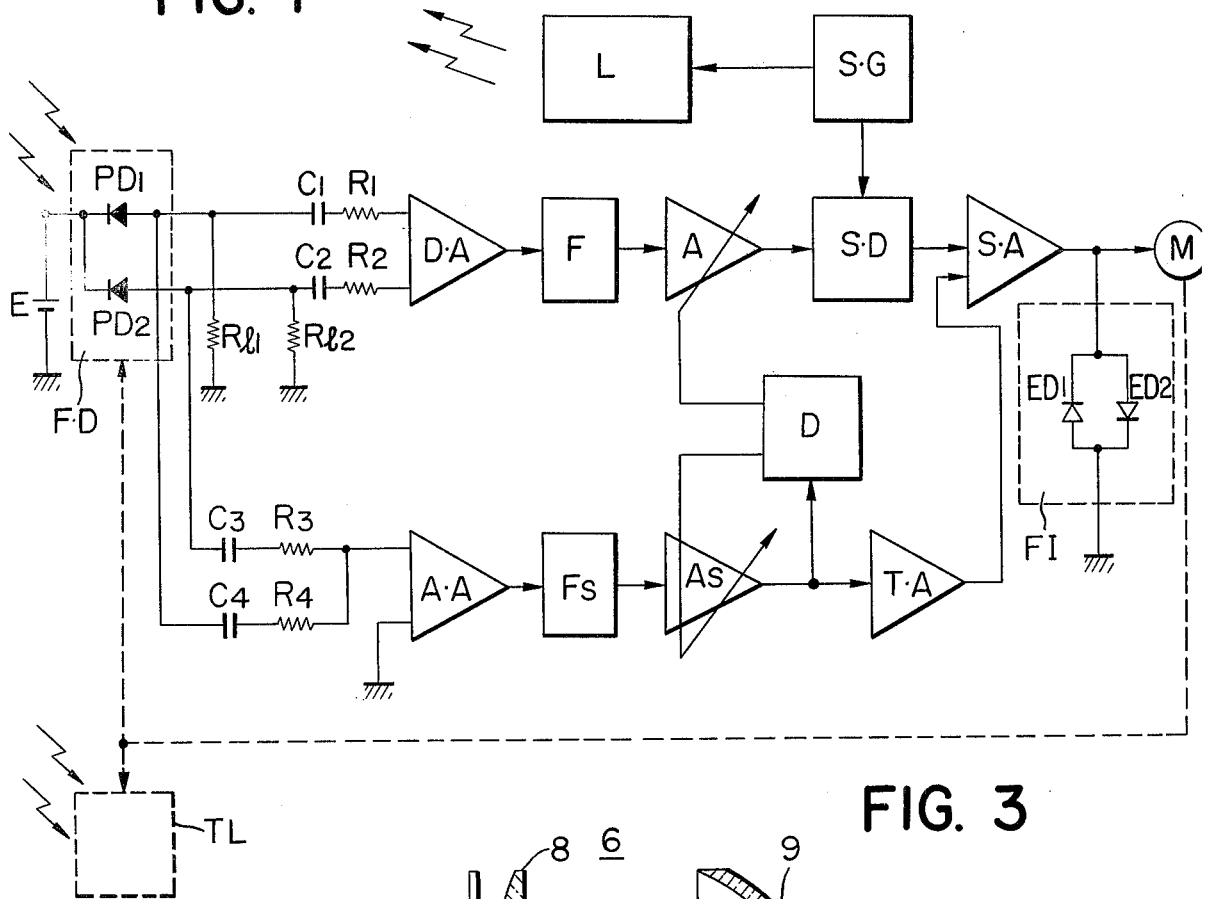
FIG. 1 is an electrical block diagram of the comparator control circuit according to the invention.

Referring to the drawings and particularly FIG. 1 which shows a block diagram of the servo mechanism of the automatic focus adjusting apparatus incorporating the comparator circuit of the invention, radiation from a radiation source L is controlled in synchronism with a signal generator S.G which is interlocked with the rotary motion of the shutter of a cinecamera, for example. The radiation is reflected by an object being photographed and impinges upon a focus detecting optical system FD which comprises at least one pair of photo-diodes $PD_1$, $PD_2$ as focus detecting members. The output from the photo-diodes $PD_1$, $PD_2$ are fed through time constant elements $C_1$, $R_1$; $C_2$, $R_2$, which constitute together a noise cut-off filter, to a differential amplifier DA which produces a differential output to be fed through a filter F and an amplifier F to a synchronous detector SD which is synchronized with the signal generator SG. The output from the synchronous detector SD is fed to a servo amplifier SA, that is in turn controlled by a trigger amplifier TA to drive a motor M with its output.

When the focus detecting optical system FD and picture-taking optical system are driven and controlled by the motor M, it follows that taking objective TL is interlocked with an automatic focus detecting apparatus which provides a range finder. It is also possible to provide a so-called TTL focussing by sharing a common light entrance by the focus detecting optical system and taking objective.

The use of an indicator FI for the under focus, the just focus and the over focus provides convenience for cinematographers. The feedback control mechanism and interlocking mechanism shown in broken lines may be eliminated by adopting an arrangement in which the outputs from the photo-diodes $PD_1$, $PD_2$ vary with a rotative adjustment of the distance ring for the taking objective, so as to allow rotative adjustment of the distance ring in accordance with an output indication of focussing condition within a finder which is produced by the motor M, or alternative focus indicator FL or a motor (meter) M associated therewith.

$ED_1$ and $ED_2$ within the indicator FI are exemplified as light emitting diodes which indicate the under focus and the over focus. E denotes a bias source, and $RL_1$ and $RL_2$ load resistors. The comparator scheme with the above arrangement involves a large variation in the level of input differential, and for this reason, a supplementary control circuit is provided in accordance with the invention which acts to normalize the level of input differential in response to the level of input sum.

The supplementary control circuit is arranged such that the outputs from the photo-diodes $PD_1$, $PD_2$ are added together through time constant elements $C_3$, $R_3$; $C_4$, $R_4$, respectively, and fed through an adder amplifier AA, filter FS and a gain-controlled amplifier AS, which is similarly constructed as the amplifier A, to a rectifier D such as a voltage doubler so that the output of the rectifier D controls the gain of the amplifier A so as to accommodate for widely varying input differential without having to excessively extend the dynamic range of the main control circuit. In the event the dynamic range of the sum input is such as would render the rectifier D incapable of detecting it, the proper detection is rendered possible by gain control of the amplifier AS by the output of the rectifier D.

If the incident light to the photo-diodes $PD_1$, $PD_2$ is reduced to make the servo system inoperative, as would be caused by a great distance to an object being photographed, excessively reduced reflectivity, fault of the apparatus, for example, the radiation source L or the like, the output of the amplifier AS is fed through a trigger amplifier TA to the servo amplifier SA of the main control circuit to control it so that the output of the servo amplifier SA drives the motor M to establish a home position (for example, hyper focal distance, distance at infinity or the like).

Figure 2:
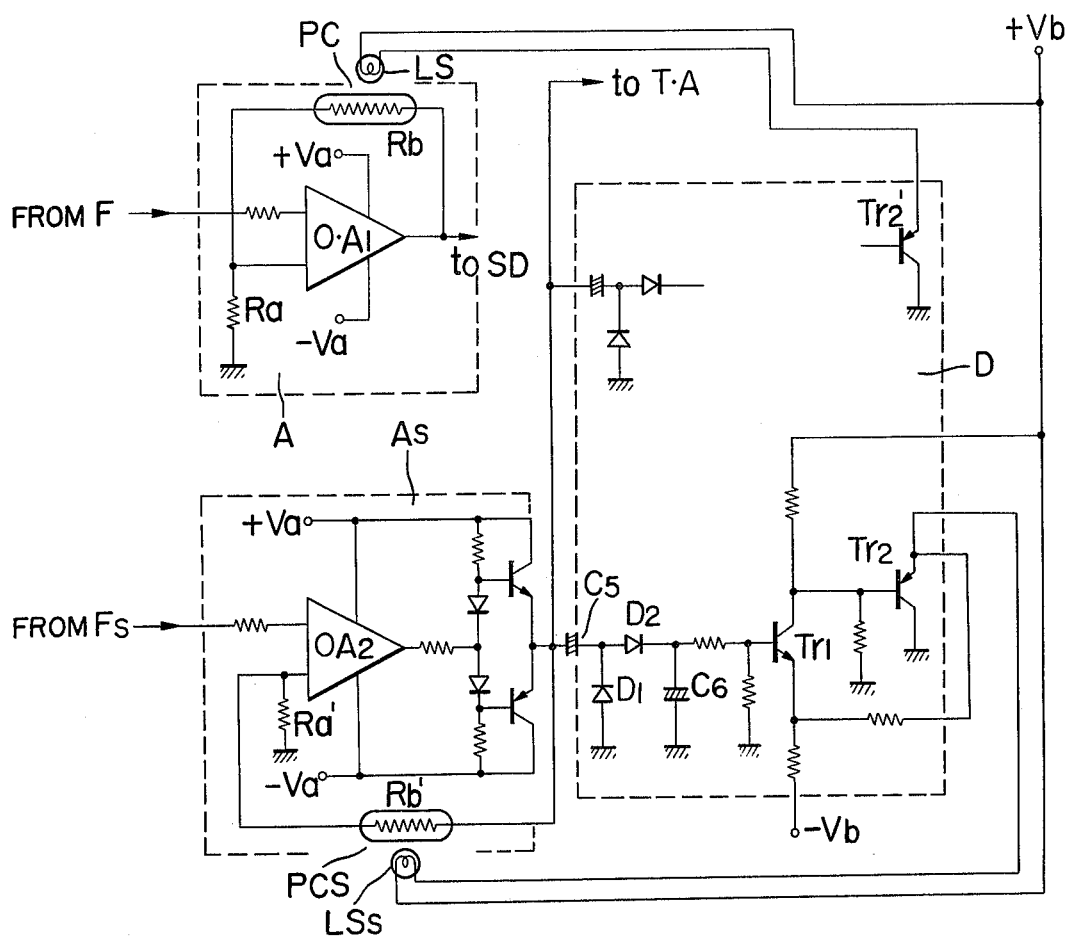
FIG. 2 is a specific circuit diagram of a supplementary control circuit shown in the block diagram of FIG. 1.

FIG. 2 shows one embodiment of the supplementary control circuit used in the circuit of FIG. 1. In FIG. 2, A and AS denote the amplifiers A and AS, respectively, shown in FIG. 1, and D denotes a level conversion circuit including a voltage doubler rectifier. PC and PCS denote photoconductor elements which are isolated from each other and associated with light sources LS and $LS_s$, respectively.

In operation, the output of the amplifier AS is converted into a d.c. level by a voltage doubler which comprises $C_5$, $C_6$, $D_1$, $D_2$, and is fed through a transistor $Tr_1$ to control a transistor $Tr_2$ and a transistor $Tr_2'$ similarly arranged as transistor $Tr_2$, thereby adjusting the brightness of the light sources for the photoconductor elements PC and PCs to vary the resistance of these photoconductor elements. As the input voltage to the amplifier AS increases, the transistor $Tr_2$ and $Tr_2'$ in the d.c. converter D conduct more heavily to increase the brightness of the light sources LS, $LS_s$, whereby the resistance $Rb$, $Rb'$ of the photoconductor elements PC, $PS_c$ reduce to lower the gain of the amplifiers A and As. Conversely, when the input voltage to the amplifier As is decreased, the circuit operates in a manner reverse to that just mentioned, thereby increasing the gain of the amplifiers A and As.

$0.A_1$ and $0.A_2$ within the amplifiers A and As represent operational amplifiers or the like, the gain of which is substantially determined by the ratio of resistance of resistors shown, $Rb/Ra$ and $Rb'/Ra'$.

By using the isolated control element PC to control the gain of the difference signal circuit, it is possible to substantially eliminates the influence of ripples and noises in the supplementary control circuit (sum signal circuit). In a servo system such as incorporating a zero method, the operational instability caused by degraded S/N ratio as a result of ripples and an increase of stationary error as a result of an extended insensitive zone can be greatly compensated for, thereby enabling the system to be improved to a sensitive and stable one.

By the use of a photoconductor element having a similar characteristic in the gain control of the sum signal circuit, there is achieved a matched response between the sum signal circuit and the difference signal circuit.

Though the drive circuit of the d.c. conversion circuit for controlling the photoconductors PC and PCs may at times be separate, usually the light amount versus resistance characteristics of the light sources LS, LSs and photoconductor elements PC, PCs do not coincide with each other, thereby requiring an adjustment of the control characteristics. Conversely, a certain servo system may require different gain controls. Thus the separate drive and control provides a control system which is easily adjusted and a flexible control characteristic.

While in the embodiment shown, the gain control characteristic is governed by the light versus resistance characteristic of the photoconductor elements PC and PCs, it may have a logarithmic response, or alternatively, a suitable change may be applied in the design to give a logarithmic compaction of the gain. Thus the arrangement of the invention enables a stable gain control to be achieved over an extensive dynamic range, and thus provide a servo system having a high stability and a high sensitivity.

Figure 3:
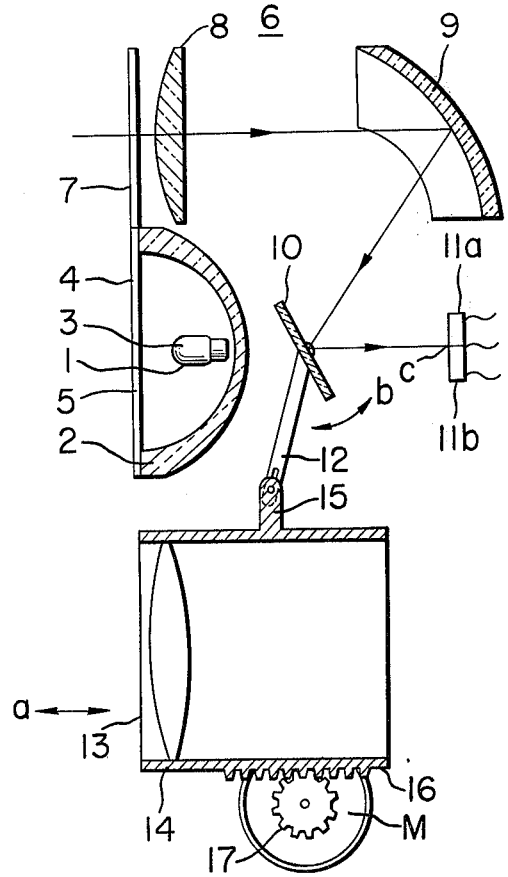
FIG. 3 is an exploded perspective view of an automatic focus adjusting apparatus used with the control circuit of FIG. 1.

FIG. 3 shows a cross section of one embodiment of the automatic focus adjusting apparatus to which the control circuit mentioned above can be applied. In this Figure, 1 denotes a lamp located at the focal point of a spherical mirror 2 or paraboloidal mirror, which is adapted to project a parallel beam from the lamp. A condenser lens 3 is disposed at the forward end of the lamp 1 to prevent scattering of direct light from the lamp. A filter 4 is placed forwardly of the lamp to pass a beam having a desired range of wavelength. The filter 4 can be suitably chosen as illustrated by employing a visible light cut-off filter when it is desired to have a beam of infra-red ray. A projector 5 consists of the members mentioned above, and a light receiving system 6 is disposed in juxtaposition with the projector 5. At its forward end, the light receiving system 6 includes a filter 7 which cuts off noise beams outside the range of wavelength of the projected beam. Obviously it is possible to position in common plane with the above-mentioned filter 4. Behind the filter 7 are disposed a cylindrical lens 8 and a spherical mirror 9, and at a suitable position removed from the optical axis of the cylindrical lens 8 are located a total reflection mirror 10 which is pivotally mounted as well as a pair of photoconductor elements $PD_1$, $PD_2$. The cylindrical lens 8 functions to converge the reflected light from the object in one direction only so that it converts the image of beam spots on the object into a linear image extending in a direction perpendicular to the plane of the sheet of the drawing. The linear image is magnified and focussed by the spherical mirror 9, and the total reflection mirror 10 is positioned so that the image focussed by the mirror 9 remains on the photoconductor elements 11a, 11b or in the vicinity thereof. The center of the total reflection mirror 10 is fixed in coincidence with the center of rotation of an arm 12, which constitutes a mechanical linkage with a projection 15 on a lens barrel 14 which carries an optical system 13 so that as the mirror barrel moves in the direction indicated by an arrow a, the mirror 10 pivotally moves as indicated by an arrow b. 16 denotes a rack securedly mounted on the mirror barrel 14, 17 a pinion meshing with the rack 16, and M a servo motor for rotating the pinion 17 to advance and refract the lens barrel 14 in the direction of the arrow a.

The apparatus operates as follows: a light beam produced by the lamp 1 is rendered sufficiently directional by the action of the spherical mirror 2 or paraboloidal mirror and the condenser lens 3, and passes through the filter 4, whereby a light beam of a particular wavelength band is projected onto an object. Reflected beam from the object, upon impinging upon the light receiving system 6, is converted into a linear image by the cylindrical lens 8, which linear image is again magnified and focussed by the spherical mirror 9 through the total reflection mirror 10 onto the photoconductor elements $PD_1$, $PD_2$ or in the vicinity thereof. The position on the optical axis of the spherical mirror 9 of the image produced thereon varies with the distance from the projector 5 to the object, so that if the total reflection mirror 10 remains stationary, the linear image focussed on the photoconductor elements $PD_1$, $PD_2$ as reflected by the total reflection mirror 10 will move across the photoconductor elements in accordance with the position of the object. Assuming now that an image of the object is properly focussed in a given position by the optical system 13 when the linear image comes into coincidence with a split line c between the photoconductor elements, a movement of the object will cause a displacement in the position of the linear image to cause an imbalance between the outputs of the photoconductor elements, whereupon the servo mechanism operates to move the optical system and rotate the total reflection mirror 10 to maintain the linear image in correct alignment with the split line c between the photoconductor elements.

Since the linear image moves in opposite directions as between the movement of the object toward the optical system and the movement of the object away from the optical system, the resulting imbalance between the outputs of the photoconductor elements will be of opposite polarities, which can be utilized in controlling the direction of rotation of the servo mechanism output, i.e. the servo motor, thereby allowing it to follow the direction of movement of the object continuously in order to maintain the optical system at a correct focal position.

The photoconductor elements $PD_1$, $PD_2$ shown in FIG. 3 are connected with the differential circuit DA. As mentioned above in connection with the circuits of FIGS. 1 and 2, the both outputs are added together and fed through the amplifier circuit AA to control the gain of the amplifier circuit A in the focussing control circuit in accordance with the sum output, so that even for a large difference in the outputs of the photoconductor elements $PD_1$, $PD_2$, there is obtained an approximately constant differential output, which greatly facilitates the processing of the output signal.

From the foregoing, it will be appreciated that in accordance with the invention, a sum signal of input signals is used to control the difference signal of the input signals so that a nearly constant and stabilized output is obtained from the differential amplifier for input signal levels varying over a broad range, thus allowing its advantageous application to a focus adjusting apparatus as illustrated by the embodiment, a control circuit adapted to process a differential signal varying over a relatively broad range of levels and the like.

What is claimed:

1. In a comparator circuit:
    first light sensitive means comprising first and second photoelectric elements;
    first means for detecting the difference between the outputs of the first and second photoelectric elements of the first light sensitive means;
    second means for detecting the sum of the outputs of the first and second photoelectric elements of the first light sensitive means;
    variable-gain amplifier means;
    means for coupling the output of the first detecting means to the input of the variable-gain amplifier means; and
    means responsive to the output of the second detecting means for varying the gain of the variable-gain amplifier means by an amount determined by, and in a direction opposite from variations in the output of the second detecting means.

2. A comparator circuit according to claim 1, in which the first detecting means comprises a differential network having a pair of input terminals connected to the respective output terminals of the first and second photoelectric elements.

3. A comparator circuit according to claim 2, in which the differential network is an operational amplifier.

4. A comparator circuit according to claim 1, in which the variable-gain amplifier means comprises, in combination, an operational amplifier having first and second inputs; means for connecting the output of the first detecting means to one input of the operational amplifier; and means including a third photoelectric element for connecting the output of the operational amplifier to the other input thereof for varying the amplification of the operational amplifier in accordance with variations in the resistance of the third photoelectric element.

5. A comparator circuit according to claim 4, in which the amplitude varying means comprises, in combination, luminous means disposed in irradiating relation to the third photoelectric element; and means for coupling the output of the second detecting means to the luminous means for varying the illumination of the luminous means to correspondingly vary the resistance of the third photoelectric element.

6. A comparator circuit according to claim 4, in which the luminous means is a lamp.

* * * * *